United States Patent [19]
Hopkins

[11] 3,864,443
[45] Feb. 4, 1975

[54] METHOD OF MAKING LIGHT-WEIGHT CONCRETE AGGREGATE

[76] Inventor: Arthur Hopkins, Stove Bridge Rd., Cornwall, N.Y.

[22] Filed: May 27, 1970

[21] Appl. No.: 40,786

[52] U.S. Cl.............................. 264/42, 65/3, 65/21, 65/86, 106/98, 106/99, 106/288 B, 106/308 B, 117/18, 117/94, 117/100, 161/174, 161/175, 161/178, 161/180, 264/45, 264/129, 264/131, 264/150
[51] Int. Cl.... C03c 25/02, B29d 23/00, B28b 11/06
[58] Field of Search........... 161/162, 168, 174, 177, 161/178, 180; 117/18, 94, 100; 65/3, 21, 86; 252/313; 264/7, 60, 62, 121, 140, 96, 143, 150, 42, 45, 128, 31; 106/97, 98, 99, 288, 308

[56] References Cited
UNITED STATES PATENTS

| | | | |
|---|---|---|---|
| 2,478,757 | 8/1949 | Foster | 117/100 S |
| 2,501,833 | 3/1950 | Webb et al. | 264/150 |
| 3,012,282 | 11/1961 | Donald | 264/141 |
| 3,023,483 | 3/1962 | Steiner | 161/175 |
| 3,030,215 | 4/1962 | Veatch et al. | 106/40 |
| 3,377,233 | 4/1968 | Jackson | 161/174 |
| 3,472,668 | 10/1969 | Pfeifer et al. | 106/87 |
| 3,509,247 | 4/1970 | Perrone et al. | 264/131 |
| 3,510,393 | 5/1970 | Burgman et al. | 161/178 |

*Primary Examiner*—Charles E. Van Horn
*Assistant Examiner*—Robert A. Dawson

[57] ABSTRACT

An aggregate for making high-strength, light-weight concrete, the aggregate being constituted by shaped glass, asbestos, cement, metal or plastic elements whose surfaces are fluted and otherwise treated to improve the adhesion of the aggregate to the concrete matrix and which can be made hollow to effect a significant decrease in weight.

10 Claims, 13 Drawing Figures

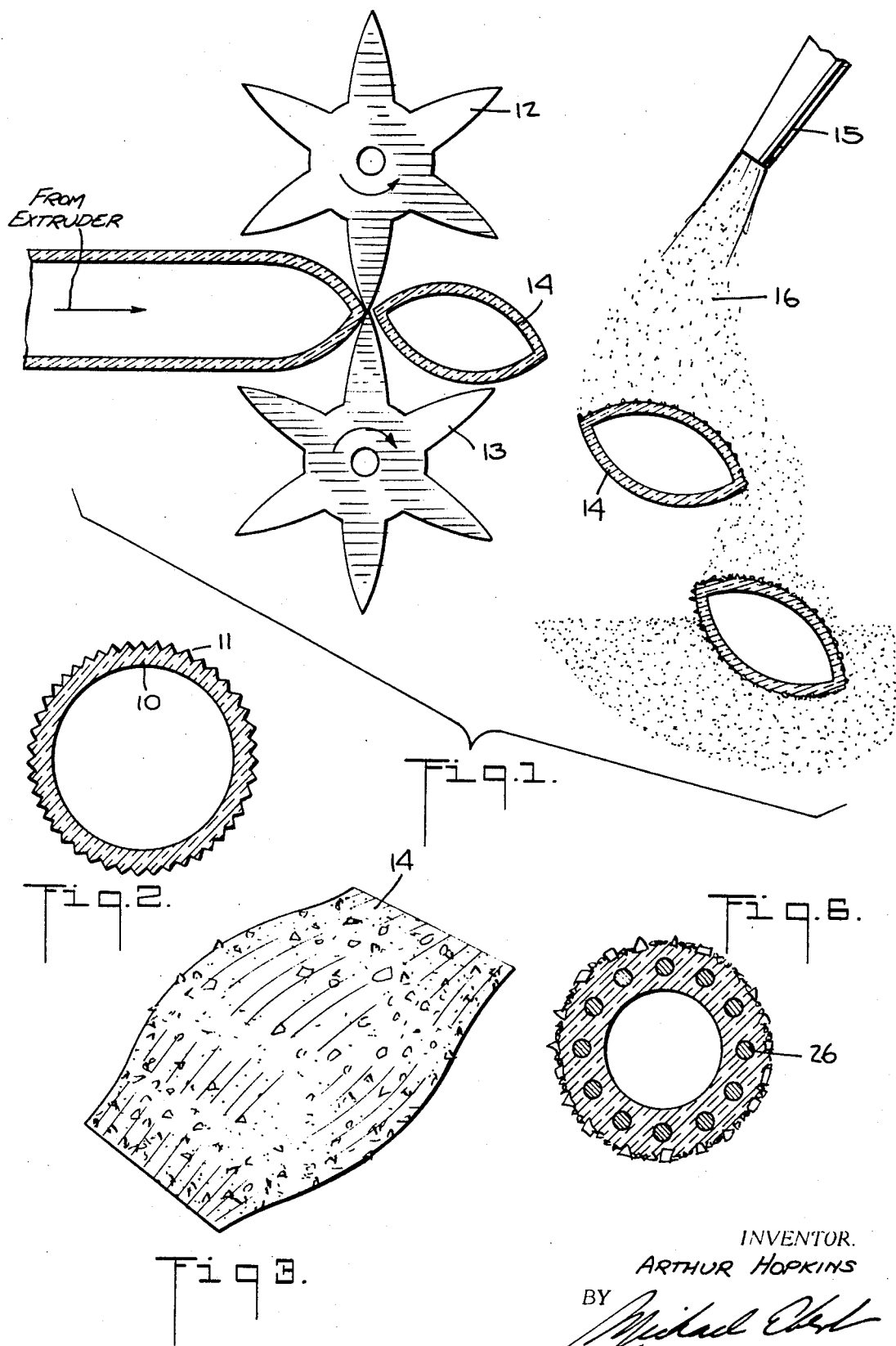

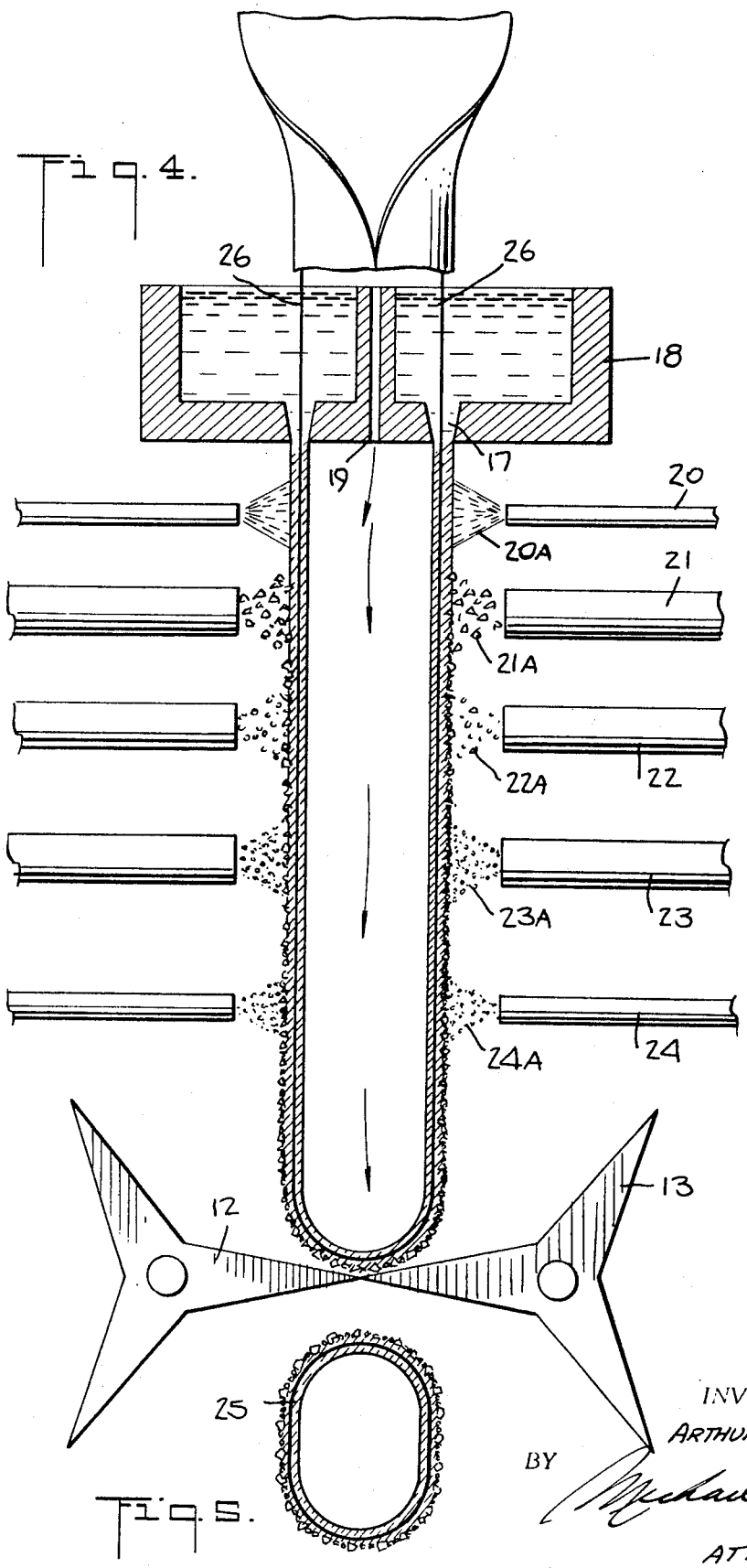

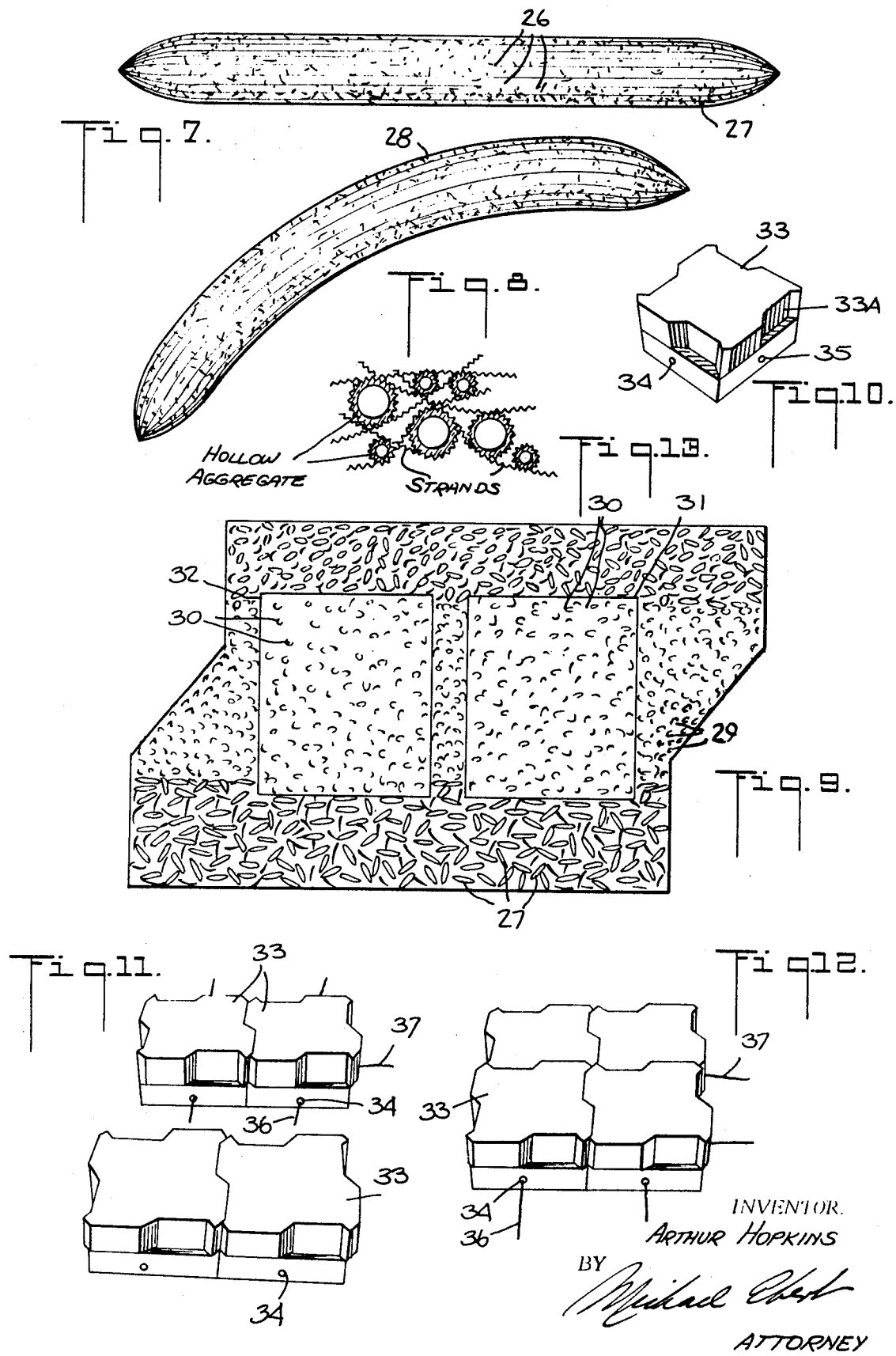

000
METHOD OF MAKING LIGHT-WEIGHT CONCRETE AGGREGATE

BACKGROUND OF THE INVENTION

This invention relates generally to concrete, and more particularly to a high-strength, light-weight aggregate for concrete, and to techniques for fabricating such aggregate.

Ordinary concrete consists of lime, an aggregate of inert particles, and water, the lime acting as a cementing agent to form a conglomerate of the particles. Concrete sets under water as well as in the air. It may be poured into individual blocks and laid like stone, or it may be molded into solid walls and slabs. Since concrete, like brick and stone, is lacking in tensile strength, it must be reinforced with steel or other means to resist bending forces. When so reinforced, concrete is applicable to an almost unlimited range of structural forms and is now the dominant building material.

Aggregate must be strong, clean, chemically inert, durable and free of organic matter, for the strength of the concrete depends on the quality of the aggregate as well as on the matrix of the cementing material. A well-graded mixture of fine and coarse aggregate is used to obtain a workable, dense mixture. Fine aggregate consists of sand or stone screenings, while crushed stone, gravel, slag and cinders are the usual constituents of coarse aggregate.

The substantial weight which is characteristic of conventional concrete has not heretofore been regarded as disadvantageous, for this weight is usually accompanied by high structural strength. But in recent years the weight of concrete has proven to be a distinct drawback in certain applications, such as in high-rise buildings, prefabricated building sections, concrete blocks and concrete-formed floating structures.

A growing need has arisen for light-weight concrete of high strength not only for floating structures, but also for buildings, breakwaters, piers and bridges. Moreover, light-weight concrete made with standard aggregate is particularly subject to attack by moisture and many deleterious air- and water-borne elements. In the polluted environments which are often encountered in a technologically advanced society, ordinary concrete is unable to stand up for prolonged periods.

SUMMARY OF THE INVENTION

In view of the foregoing, it is the primary object of this invention to provide an aggregate for producing very strong and light-weight concrete, which aggregate is constituted by strand-like elements and hollow elements, both encrusted with particles rather than solid stone or other conventional aggregate material.

A significant feature of the invention is that aggregate in accordance with the invention may be made in a variety of shapes, sizes and weights, such as thick-or thin-walled hollow elements which are long, short, curved or spherical so that the aggregate may be proportioned to satisfy specific requirements. Because the form, size and weight of the aggregate is readily controllable, the interstices of the concrete may be accurately predicted, and it becomes feasible to design a finished concrete structure with exceptional accuracy.

More specifically, it is an object of the invention to provide aggregate in the form of metal or glass strands or hollow elements formed of metal, asbestos, cement or glass, whose surface is encrusted with particles that promote adhesion in the matrix, which particles may be constituted by fiberglass, asbestos, quartz, sand, metal, stone or other material appropriate to the use to which the aggregate is to be put.

Still another object of the invention is to provide steel-reinforced, hollow aggregate which affords both lightness and high strength.

Also an object of the invention is to provide hollow aggregate having cellular walls to improve the thermal and acoustic insulation characteristics thereof.

Briefly stated, these objects are accomplished by continuously extruding a strip, rod or tube of glass or other aggregate material through a die, and thereafter, while the extruded body is hot and moldable, spraying or otherwise treating the surfaces thereof to provide a roughened surface promoting adhesion, and then sectioning the extruded and treated body into aggregate of suitable length.

OUTLINE OF THE DRAWING

For a better understanding of the invention, as well as further features and other objects thereof, reference is made to the following detailed description to be read in conjunction with the accompanying drawing, in which:

FIG. 1 schematically shows one preferred technique for producing aggregate according to the invention;

FIG. 2 is a transverse section taken through the extruded tube of FIG. 1;

FIG. 3 is a perspective view of an aggregate element;

FIG. 4 schematically shows another technique for producing aggregate;

FIG. 5 shows a transverse section taken through the extruded tube of FIG. 4;

FIG. 6 shows a transverse section taken through the extruded tube of FIG. 4, when reinforcing wires are combined therewith;

FIG. 7 is an elevational view of an aggregate produced by the technique shown in FIG. 4;

FIG. 8 is a perspective view of a curved aggregate element in accordance with the invention;

FIG. 9 is a section taken through a concrete structure incorporating aggregate according to the invention;

FIG. 10, in perspective, shows a concrete block according to the invention;

FIG. 11 shows four such blocks in separated pairs;

FIG. 12 shows the four blocks when intermeshed; and

FIG. 13 illustrates the combination of strand-like and hollow aggregate elements.

DESCRIPTION OF THE INVENTION

Referring now to the drawing, and more particularly to FIGS. 1, 2 and 3, there is shown a technique for making light-weight aggregate for concrete by using hollow glass or plastic aggregates, rather than solid stone or other relatively heavy materials.

The aggregate in accordance with the invention is fabricated by continuously extruding a tube 10 of vitreous or plastic material through an extrusion die whose orifice is scored to produce a tube whose outer surface 11 is longitudinally fluted, as shown in FIG. 2. The tube emerging from the extrusion die is still hot and moldable and in this condition it is sealed and sectioned into short lengths in a single operation to form hollow elements suitable for aggregate.

This is accomplished by a pair of co-acting star wheels 12 and 13 which are driven to rotate concurrently in opposing directions. As the wheels rotate, the radial cutting teeth thereof engage the surface of tube 10 and press and deform the tube to cause it to assume a flattened shape before the co-acting teeth meet to sever the flattened section from the tube, thereby defining a pillow-shaped hollow element 14, as shown separately in FIG. 3.

As the severed section is discharged from the cutting wheels, it is immediately subjected to a blast of pressurized sand and fine quartz particles 16 from a nozzle 15. These particles embed themselves in the surface of the glass or plastic which is still soft and remain entrapped therein when the element cools and hardens, thereby producing an encrusted element.

Thus the surface of the hollow, light-weight elements 14 is fluted and encrusted to ensure good adhesion with the cementing matrix. The resultant concrete is considerably lighter than conventional concrete, and has far greater resistance to deleterious agents found in typical air and water environments.

To further enhance the heat and sound insulating properties of the aggregate, the walls thereof, rather than being solid, may be made cellular, so that their thermal and acoustic characteristics are improved by entrapped air. This may be accomplished by introducing air bubbles or pockets in the glass in the course of extrusion or, in the case of plastics, by the use of foaming agents which are adapted to create a closed cell structure.

The surface particles and aggregates may be chosen from a wide variety of materials to satisfy various requirements. When using aggregate having large surface particles only, there might be a tendency for the aggregate to interlock and cluster. While this is desirable structurally, it may impair the ability of the aggregate to flow freely.

In order, therefore, to attain both flowability and a degree of interlocking which does not militate against flowability, several sizes of aggregate having surface particles of different degrees of coarseness may be intermixed to produce the desired characteristics.

In some instances, the presence of surface particles may be undesirable, and in order to roughen the surface, one may acid-dip the aggregate or subject the aggregate in the hardened state to sand-blasting, thereby to ensure adequate adhesion with the cement matrix.

Since the aggregate, when made of glass, is translucent, it becomes possible by using a somewhat translucent matrix, such as a special cement having some measure of light permeability, to produce a concrete which is at least partially translucent, so that one then has a structural material which is not entirely opaque but which permits light to pass therethrough. This type of concrete has distinct advantages when constructing windowless walls or enclosures.

Instead of making the hollow aggregate of glass or plastic, one may use ceramic or asbestos cement for this purpose in the manner shown in FIG. 4 wherein a tube of such material is extruded through the orifice 17 of a die head 18, which includes a central bore 19 through which hot air or steam is ejected to maintain the emerging tube in moldable condition. The thickness of the tube walls is controllable by the temperature of the glass or plastic, the dimensions of the die orifice, the amount of air injected into the tube, and the speed of the pull.

As the tube travels toward the cutting or star wheels 12 and 13, it is subjected to a series of treatments at a succession of stages. At the first stage 20, the tube, just after emerging from the die, is sprayed with a ceramic, metal or cement glaze 20A to provide a coating protecting the aggregate from free lime in the cement when producing concrete, and also to facilitate adherence of the particles which are thereafter applied to the surface in the succeeding stages.

At the subsequent stages 21, 22 and 23, particles are impinged against the moldable surface of the tube to embed therein, the particles 21A being of relatively large size at stage 21, of medium size 22A at atage 22, and of fine size 23A at stage 23. The sequential application of particles of varying sizes ensures maximum coverage of the surface. Finally at stage 34 the surface of the tube is sprayed or dipped with a thin film 24A of paint or plastic to protect the aggregate from chemical attack. Acrylic, urethane, epoxy, polyester or fish-oil-base coatings are suitable for this film.

Thus, after the treated tube is deformed, sealed, and sectioned by cutting wheels 12 and 13, the resultant aggregate 25, as shown in FIG. 5, has a protected, encrusted surface which facilitates interlocking and is adapted to make a light-weight and strong concrete when embedded in a concrete matrix.

In some instances, it is important that the aggregate be of exceptional strength, and for this purpose the aggregate may be reinforced by steel wires. This is accomplished by introducing an array of steel wires 26 through the tapered die orifice as shown in FIG. 4. These wires are severed by cutting wheels 12 and 13 to produce a steel-reinforced tube as shown in FIG. 6 wherein the wires 26 are shown embedded in tube 10. When the tube is sectioned, it forms a long steel-reinforced aggregate 27 as shown in FIG. 7. It may also be desirable, before permitting the aggregate to cool and harden, to further deform its shape to produce a curved or twisted aggregate 28 as shown in FIG. 8. It will be appreciated that the invention is not limited to the shape shown in FIG. 8, and that the moldable aggregate may be given other forms appropriate to its intended use.

One of the anticipated uses for the aggregate is in floating concrete forms to create breakwater, piers, roadways, marinas and airports. In the case of a floating airport, substantial strength is needed in the bottom region of the form to withstand landing pressures. This problem could be solved with conventional steel-reinforcing techniques, but such reinforcing is subject to attack by salt water.

However, as shown in FIG. 9, one may build a structure with a concrete section at the bottom having the desired characteristics by the use of relatively long aggregate 27, reinforced with steel wires. The region thereabove, which is required to withstand great compression, is made up of solid glass aggregate 29 or hollow aggregate having very thick walls. To save weight, one may pack light-weight aggregate 30 of hollow plastic or glass floating material in compartments 31 and 32 without cementing them together, thereby reducing the weight of the section. It will be evident that various forms of composite concrete structures are made possible by the use of different types of aggregate made in accordance with the invention.

In making roadways, runways and other concrete surfaces, it is desirable to make use of concrete blocks, as shown in FIGS. 10, 11 and 12, which incorporate hollow aggregate in accordance with the invention. Each basic block unit 33, as shown in FIG. 10, is, in its upper section, provided on all sides thereof with a tongue-and-groove formation 33A, so that when the blocks are brought tobether, they intermesh neatly, as shown in FIGS. 11 and 12.

Each block is, in its lower section, provided with bores 34 and 35 which extend along intersecting paths from side to side of the block in spaced planes, which bores serve to receive reinforcing cables 36 and 37 as shown in FIGS. 10 and 11. It will be evident that any number of concrete blocks may be cinched together to provide light-weight concrete surfaces of exceptional strength.

In FIG. 4 there is illustrated a process for extruding a tube of aggregate material, which tube, in the softened state, is sprayed with particles in a series of stages and then sectioned to form particle-encrusted aggregate. In lieu of a tube, one may pass a core of wire or ribbon formed of glass or plastic fiber, or of metal, through a die adapted to apply a thermoplastic layer to the core, after which the layer, in the softened state, is sprayed with particles in the manner illustrated in FIG. 4. The treated core is then sectioned to produce strand-like elements. Such elements, coupled with hollow elements made in accordance with the invention, produces a composite aggregate which, when combined with a matrix as shown in FIG. 13, gives rise to a light-weight concrete of exceptional strength-to-weight ratio.

As a basic material for the hollow glass aggregate, one may use discarded bottles which represent a plentiful and cheap source of glass. Moreover, ordinary garbage, including cans and bottles, when fired in a cement kiln, produces a glass-like substance suitable for making the hollow aggregate.

While there have been shown preferred embodiments of the high-strength, light-weight concrete aggregate of the invention, it will be appreciated that many changes and modifications may be made therein without, however, departing from the essential spirit of the invention.

I claim:

1. The method of making aggregate for use in a concrete matrix, said method comprising the steps of:
   A. continuously extruding a tube of moldable material through a die, said material having structural characteristics suitable for an aggregate, said tube having a diameter appropriate to aggregate,
   B. sealing and sectioning the tube to form individual aggregate elements; and
   C. treating the surface of the individual elements, while still moldable, to improve their adhesion characteristics.

2. The method as set forth in claim 1, wherein said tube is formed of glass.

3. The method as set forth in claim 1, wherein said tube is formed of synthetic plastic material.

4. The method as set forth in claim 1, wherein said tube is formed of ceramic material.

5. The method as set forth in claim 1, wherein the surface of said tube is longitudinally fluted in the course of extrusion.

6. The method as set forth in claim 1, wherein the surface of said tube is sprayed with particles before said tube is sectioned, whereby the particles embed in the surface and become encrusted therein.

7. The method as set forth in claim 6, wherein said particles are of different size and are successively applied so that the coarse particles are applied, then the medium particles and finally the fine particles are applied.

8. The method as set forth in claim 7, wherein the particle-coated tube is sprayed with a protective film.

9. The method as set forth in claim 1, wherein the extruded tube is formed with closed cells to incorporate air pockets therein which improve the thermal properties of the aggregate.

10. The method as set forth in claim 1, wherein the tube is extruded with reinforcing wires embedded therein.

* * * * *